US008615514B1

(12) United States Patent
Fernandes et al.

(10) Patent No.: US 8,615,514 B1
(45) Date of Patent: Dec. 24, 2013

(54) EVALUATING WEBSITE PROPERTIES BY PARTITIONING USER FEEDBACK

(75) Inventors: Neil C. Fernandes, San Francisco, CA (US); Michael Flaster, Menlo Park, CA (US); April R. Lehman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 12/699,549

(22) Filed: Feb. 3, 2010

(51) Int. Cl.
    *G06F 17/30* (2006.01)
(52) U.S. Cl.
    USPC .......................................... 707/728
(58) Field of Classification Search
    USPC .......................................... 707/728
    See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 6,006,222 A | 12/1999 | Culliss | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 | 12/2001 | Chidlovskii et al. | |
| 6,341,283 B1 | 1/2002 | Yamakawa et al. | |
| 6,363,378 B1 | 3/2002 | Conklin et al. | |
| 6,370,526 B1 | 4/2002 | Agrawal et al. | |
| 6,480,843 B2 | 11/2002 | Li | |
| 6,490,575 B1 | 12/2002 | Berstis | |
| 6,526,440 B1 | 2/2003 | Bharat | |

(Continued)

FOREIGN PATENT DOCUMENTS

| | | |
|---|---|---|
| WO | WO 00/77689 | 12/2000 |
| WO | WO 01/16807 | 3/2001 |
| WO | WO 01/67297 | 9/2001 |
| WO | WO 2004/059514 | 7/2004 |

OTHER PUBLICATIONS

Joachims, "Evaluating Search Engines Using Clickthrough Data", Cornell University, Department of Computer Science, Draft, Feb. 19, 2002, 13 pages.

(Continued)

*Primary Examiner* — Amresh Singh
(74) *Attorney, Agent, or Firm* — Fish & Richardson P.C.

(57) ABSTRACT

Methods, systems, and apparatus, including computer programs encoded on a computer storage medium, for evaluating website properties by partitioning user feedback data are disclosed. In one aspect, a method includes receiving a plurality of document query pairs (D-Qs) associated with a website, partitioning the plurality of D-Qs into one or more groups according to values for a partition parameter associated with the plurality of D-Qs, evaluating a property parameter of the website based on aggregated user feedback data of the D-Qs included within at least one of the one or more groups, and providing the evaluated property parameter as an input for ranking documents from the website as result documents for searches.

33 Claims, 8 Drawing Sheets

(56) References Cited

U.S. PATENT DOCUMENTS

| | | | |
|---|---|---|---|
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,266,765 B2 | 9/2007 | Golovchinsky et al. |
| 7,293,016 B1 * | 11/2007 | Shakib et al. ............ 1/1 |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,610,282 B1 | 10/2009 | Datar et al. |
| 7,636,714 B1 | 12/2009 | Lamping et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,320 B2 | 10/2010 | Makeev |
| 7,836,058 B2 | 11/2010 | Chellapilla et al. |
| 7,844,589 B2 | 11/2010 | Wang et al. |
| 7,849,089 B2 | 12/2010 | Zhang et al. |
| 7,853,557 B2 | 12/2010 | Schneider et al. |
| 7,877,404 B2 | 1/2011 | Achan et al. |
| 7,895,177 B2 | 2/2011 | Wu |
| 7,925,498 B1 | 4/2011 | Baker et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,051,061 B2 | 11/2011 | Niu et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,086,599 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0135877 A1 | 7/2003 | Haertel et al. |
| 2003/0149704 A1 | 8/2003 | Yayoi et al. |
| 2003/0167252 A1 | 9/2003 | Odom et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 * | 10/2005 | Vadon ............ 707/3 |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0173830 A1 | 8/2006 | Smyth et al. |

(56) References Cited

U.S. PATENT DOCUMENTS

| | | | |
|---|---|---|---|
| 2006/0195443 | A1* | 8/2006 | Franklin et al. .................... 707/5 |
| 2006/0200476 | A1 | 9/2006 | Gottumukkala et al. |
| 2006/0200556 | A1 | 9/2006 | Brave et al. |
| 2006/0230040 | A1 | 10/2006 | Curtis et al. |
| 2007/0005575 | A1 | 1/2007 | Dai et al. |
| 2007/0005588 | A1 | 1/2007 | Zhang et al. |
| 2007/0038659 | A1 | 2/2007 | Datar et al. |
| 2007/0061211 | A1 | 3/2007 | Ramer et al. |
| 2007/0081197 | A1 | 4/2007 | Omoigui |
| 2007/0106659 | A1* | 5/2007 | Lu et al. ............................ 707/5 |
| 2007/0112730 | A1 | 5/2007 | Gulli et al. |
| 2007/0130370 | A1 | 6/2007 | Akaezuwa |
| 2007/0156677 | A1 | 7/2007 | Szabo |
| 2007/0192190 | A1 | 8/2007 | Granville |
| 2007/0208730 | A1 | 9/2007 | Agichtein et al. |
| 2007/0214131 | A1 | 9/2007 | Cucerzan et al. |
| 2007/0233653 | A1* | 10/2007 | Biggs et al. ........................ 707/3 |
| 2007/0255689 | A1* | 11/2007 | Sun et al. .......................... 707/3 |
| 2007/0260597 | A1 | 11/2007 | Cramer et al. |
| 2007/0266021 | A1 | 11/2007 | Aravamudan et al. |
| 2007/0266439 | A1 | 11/2007 | Kraft |
| 2007/0288450 | A1 | 12/2007 | Datta et al. |
| 2008/0010143 | A1 | 1/2008 | Kniaz et al. |
| 2008/0027913 | A1 | 1/2008 | Chang et al. |
| 2008/0052219 | A1 | 2/2008 | Sandholm et al. |
| 2008/0052273 | A1 | 2/2008 | Pickens |
| 2008/0059453 | A1 | 3/2008 | Laderman |
| 2008/0077570 | A1 | 3/2008 | Tang et al. |
| 2008/0082518 | A1 | 4/2008 | Loftesness |
| 2008/0091650 | A1 | 4/2008 | Fontoura et al. |
| 2008/0114624 | A1 | 5/2008 | Kitts |
| 2008/0114729 | A1 | 5/2008 | Raman et al. |
| 2008/0114750 | A1 | 5/2008 | Saxena et al. |
| 2008/0140699 | A1 | 6/2008 | Jones et al. |
| 2008/0162475 | A1 | 7/2008 | Meggs et al. |
| 2008/0183660 | A1 | 7/2008 | Szulcewski |
| 2008/0189269 | A1 | 8/2008 | Olsen |
| 2008/0228442 | A1 | 9/2008 | Lippincott et al. |
| 2008/0256050 | A1 | 10/2008 | Zhang et al. |
| 2008/0313168 | A1 | 12/2008 | Liu et al. |
| 2008/0313247 | A1 | 12/2008 | Galvin |
| 2009/0012969 | A1 | 1/2009 | Rail et al. |
| 2009/0055392 | A1 | 2/2009 | Gupta et al. |
| 2009/0157643 | A1 | 6/2009 | Gollapudi et al. |
| 2009/0182723 | A1 | 7/2009 | Shnitko et al. |
| 2009/0287656 | A1 | 11/2009 | Bennett |
| 2010/0106706 | A1 | 4/2010 | Rorex et al. |
| 2010/0131563 | A1 | 5/2010 | Yin |
| 2010/0205541 | A1 | 8/2010 | Rapaport et al. |
| 2010/0228738 | A1 | 9/2010 | Mehta et al. |
| 2010/0241472 | A1 | 9/2010 | Hernandez |
| 2012/0191705 | A1 | 7/2012 | Tong et al. |

OTHER PUBLICATIONS

Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

Boldi, et al.; *The Query flow Graph: Model and Applications; CKIM '08*, Oct. 26-30, Napa Valley, California, USA, pp. 609-617.

Boyan et al.; *A Machine Learning Architecture for Optimizing Web Search Engines*; Aug. 1996; Internet-based information systems—Workshop Technical Report—American Association for Artificial Intelligence, p. 1-8.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, The Netherlands, 8 pages.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grečar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

Joachims; *Optimizing search engines using clickthrough data*; 2002; Proceedings of the ACM SIGKDD International Conference on Knowledge Discovery and Data Mining, p. 133-142.

Joachims et al., "Search Engines that Learn from Implicit Feedback"; Aug. 2007, IEEE Computer Society.

Kelly, et al.; *Implicit Feedback for Inferring User Preference: A Bibliography*; SIGIR Forum, vol. 37, No. 2 (2003), pp. 18-28.

Linden, Greg et al., Amazon.com *Recommendations: Item-to-Item Collaborative Filtering*, [online], http://computer.org/internet/, IEEE Internet Computing, Jan.-Feb. 2003, IEEE Computer Society, pp. 76-80.

U.S. Patent Office, U.S. Appl. No. 11/556,143, filed Nov. 2, 2006, in Office Action mailed Jan. 25, 2010, 14 pages.

U.S. Patent Office, U.S. Appl. No. 11/556,143, filed Nov. 2, 2006, in Office Action mailed Jul. 6, 2010, 20 pages.

U.S. Patent Office, U.S. Appl. No. 11/556,143, filed Nov. 2, 2006, in Office Action mailed Apr. 20, 2011, 18 pages.

Nicole, Kristen, *Heeii is StumbleUpon Plus Google Suggestions*, [online], Retrieved from the Internet http://mashable.com/2007/05/15/heeii/, 11 pages.

Lemire, Daniel, *Scale and Translation Invariant Collaborative Filtering Systems*, Published in Information Retrieval, 8(1), pp. 129-150, 2005.

U.S. Patent Office, U.S. Appl. No. 11/685,095, filed Mar. 12, 2007, in Office Action mailed Feb. 8, 2010, 31 pages.

U.S. Patent Office, U.S. Appl. No. 11/685,095, filed Mar. 12, 2007, in Office Action mailed Feb. 25, 2009, 21 pages.

U.S. Patent Office, U.S. Appl. No. 11/685,095, filed Mar. 12, 2007, in Office Action mailed Sep. 10, 2009, 23 pages.

U.S. Patent Office, U.S. Appl. No. 11/685,095, filed Mar. 12, 2007, in Office Action mailed Apr. 13, 2011, 31 pages.

Radlinski, et al., *Query Chains: Learning to Rank from Implicit Feedback*, KDD '05, Aug. 21-24, 2005, Chicago, Illinois, USA, 10 pages.

U.S. Patent Office, U.S. Appl. No. 11/556,086 filed Nov. 2, 2006, in Office Action mailed Jun. 23, 2010, 21 pages.

Schwab, et al., *Adaptivity through Unobtrusive Learning*, 2002, 16(3), pp. 5-9.

(56) References Cited

OTHER PUBLICATIONS

Stoilova, Lubomira et al., *GiveALink: Mining a Semantic Network of Bookmarks for Web Search and Recommendation*, LinkKDD '05, Aug. 21, 2005, Chicago, IL, USA, 8 pages.

W3C, URIs, URLs and URNs: Classification and Recommendations 1.0, Report from the joint W3C/IETF URI Planning Interest Group, Sep. 21, 2001, 8 pages.

Xiao, et al., *Measuring Similarity of Interests for Clustering Web-Users*, ADC, 2001, pp. 107-114.

Xie et al., *Web User Clustering from Access Log Using Belief Function*, K-CAP '01, Oct. 22-23, 2001, Victoria, British Columbia, Canada, pp. 202-208.

Yu et al., *Selecting Relevant Instances for Efficient and Accurate Collaborative Filtering*, CIKM '01, Nov. 5-10, 2001, Atlanta, Georgia, pp. 239-246.

Zeng et al., *Similarity Measure and Instance Selection for Collaborative Filtering*, WWW '03, May 20-24, 2003, Budapest, Hungary, pp. 652-658.

Zeng, et al., "Learning to Cluster Web Search Results", SIGIR '04, Proceedings of the 27th Annual International ACM SIGIR conference on research and development in information retrieval, 2004.

Soumen Chakrabarti, et al. "Enhanced Topic Distillation using Text, Markup tags, and Hyperlinks" ACM, Sep. 9-12, 2001, pp. 208-216.

Gabriel Somlo et al., "Using Web Hepler Agent Profiles in Query Generation", ACM, Jul. 2003, pp. 812-818.

Australian Patent Office Non-Final Office Action in AU App. Ser. No. 2004275274, mailed Feb. 3, 2010, 2 pages.

Dan Olsen et al., "Query-by-critique: Spoken Language Access to Large Lists", ACM, Oct. 2002, pp. 131-140.

Susan Gauch et al., "A Corpus Analysis Approach for Automatic Query Expansion and its Extension to Multiple Databases", ACM, Jul. 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. and L. Page, The Anatomy of a Large-Scale Hypertextual Web Search Engine, Computer Science Department, Apr. 1998.

International Search Report and Written Opinion for Application No. PCT/US2004/029615, dated Jan. 19, 2005, 8 pages.

Hungarian Patent Office, International Search Report and Written Opinion for Application No. 200806756-3, dated Nov. 19, 2010 12 pages.

Authorized Officer Athina Nickitas-Etienne, International Preliminary Report and Written Opinion for Application No. PCT/US2004/029615, mailed Mar. 23, 2006.

Indian Office Action in Indian Application No. 686/KOLNP/2006, mailed Jun. 3, 2008, 2 pages.

Danish Search Report and Written Opinion for Application No. 200601630-7, dated Jun. 21, 2007, 15 pages.

Jones et al., "Pictures of Relevance: A Geometric Analysis of Similarity Measures", Journal of the American Society for Information Science, Nov. 1987, 23 pages.

Kaplan et al., "Adaptive Hypertext Navigation Based On User Goals and Context", User Modeling and User-Adapted Interaction 2, Sep. 1, 1993; pp. 193-220, 28 pages.

Liddy et al., "A Natural Language Text Retrieval System With Relevance Feedback", 16th National Online, May 2-6, 1995, 3 pages.

* cited by examiner

EVALUATING WEBSITE PROPERTIES BY PARTITIONING USER FEEDBACK

BACKGROUND

An internet search engine is a tool typically designed to search for information on the World Wide Web. Users submit search queries to the search engine and the search engine identifies and presents a list of result documents in response to each search query. The list of result documents consists of links to webpages, images, and other types of files, typically identified and retrievable by their Uniform Resource Locators (URLs). To identify documents and items that are most relevant to a user's needs and to present them in a manner that is most useful to the user, the list of results documents can be ranked according to various relevance and quality parameters before being presented to the user.

User actions with respect to each result document presented in response to a search query submission can serve as feedback that is indicative of the relevance and quality of the result document with respect to the search query. User feedback data for each result document can be collected from multiple users and aggregated over time, and statistics of the aggregated user feedback data for the result document can be used to adjust the ranking of the document in the result list for future submissions of the search query.

SUMMARY

In general, one innovative aspect of the subject matter described in this specification can be embodied in methods that include the actions of: receiving a plurality of document query pairs (D-Qs) associated with a website, each of the D-Qs being associated with a respective query, a respective document from the website, and respective user feedback data indicative of user behavior relative to the respective document as a search result for the respective query; partitioning the plurality of D-Qs into one or more groups according to values for a partition parameter associated with the plurality of D-Qs, each group being defined by a respective value range for the partition parameter and including D-Qs associated with partition parameter values that are within the respective value range; evaluating, by a processor, a property parameter of the website based on aggregated user feedback data of the D-Qs included within at least one of the one or more groups; and providing the evaluated property parameter as an input for ranking documents from the website as result documents for searches.

Other embodiments of this aspect include corresponding systems, apparatus, and computer programs, configured to perform the actions of the methods, encoded on computer storage devices.

These and other embodiments can each optionally include one or more of the following features.

In some implementations, each user feedback data includes one or more of a click-count, an impression count, and a click-to-impression ratio.

In some implementations, the click-count is weighted by click-duration or click-recency.

In some implementations, the partition parameter associated with each D-Q is an information retrieval score of a top-ranked document responsive to the respective query of the D-Q.

In some implementations, the partition parameter associated with each D-Q is a length of the respective query of the D-Q.

In some implementations, the partition parameter associated with each D-Q is a measure of popularity of the respective query of the D-Q.

In some implementations, the partition parameter associated with each D-Q is a measure of commerciality of the respective query of the D-Q.

In some implementations, the partition parameter associated with each D-Q is a total number of search results responsive for the respective query of the D-Q.

In some implementations, evaluating the property parameter of the website further includes the actions of: aggregating the respective user feedback data associated with the D-Qs in each of the one or more groups; determining a distribution of aggregated user feedback data among the one or more groups; and evaluating the property parameter based on the distribution.

Particular embodiments of the subject matter described in this specification can be implemented to realize one or more of the following advantages.

In some implementations, a property parameter of the website is evaluated based on a distribution of aggregated user feedback data among different partitions of user feedback data that are associated with different value ranges of a partition parameter. The property parameter reflects a property of the website that influences the quality of the website, in either a query-dependent context or a query-independent context. Common property parameters include, for example, overall document quality, popularity, commerciality, and so on. The partition parameter being used can be chosen to suit the particular property parameter being evaluated. Common partition parameters include, for example, the IR score of top result document for queries associated with the website, query length, and so on. By varying the definition of the partition parameter, the same set of user feedback data for documents from a website can be mined to score the document for many different property parameters that are useful in identifying relevant and high quality documents, and filter out unsuitable documents or spam.

Furthermore, statistical analysis of the aggregation of user feedback data can be performed at a website level, and the website property parameter can be used as an input in ranking individual documents from the website as search results for queries. Therefore, even if user feedback data for a particular document from the website is lacking, the user feedback data for other documents from the website can be utilized to improve the ranking accuracy of the particular document in searches.

The details of one or more embodiments of the subject matter that are described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
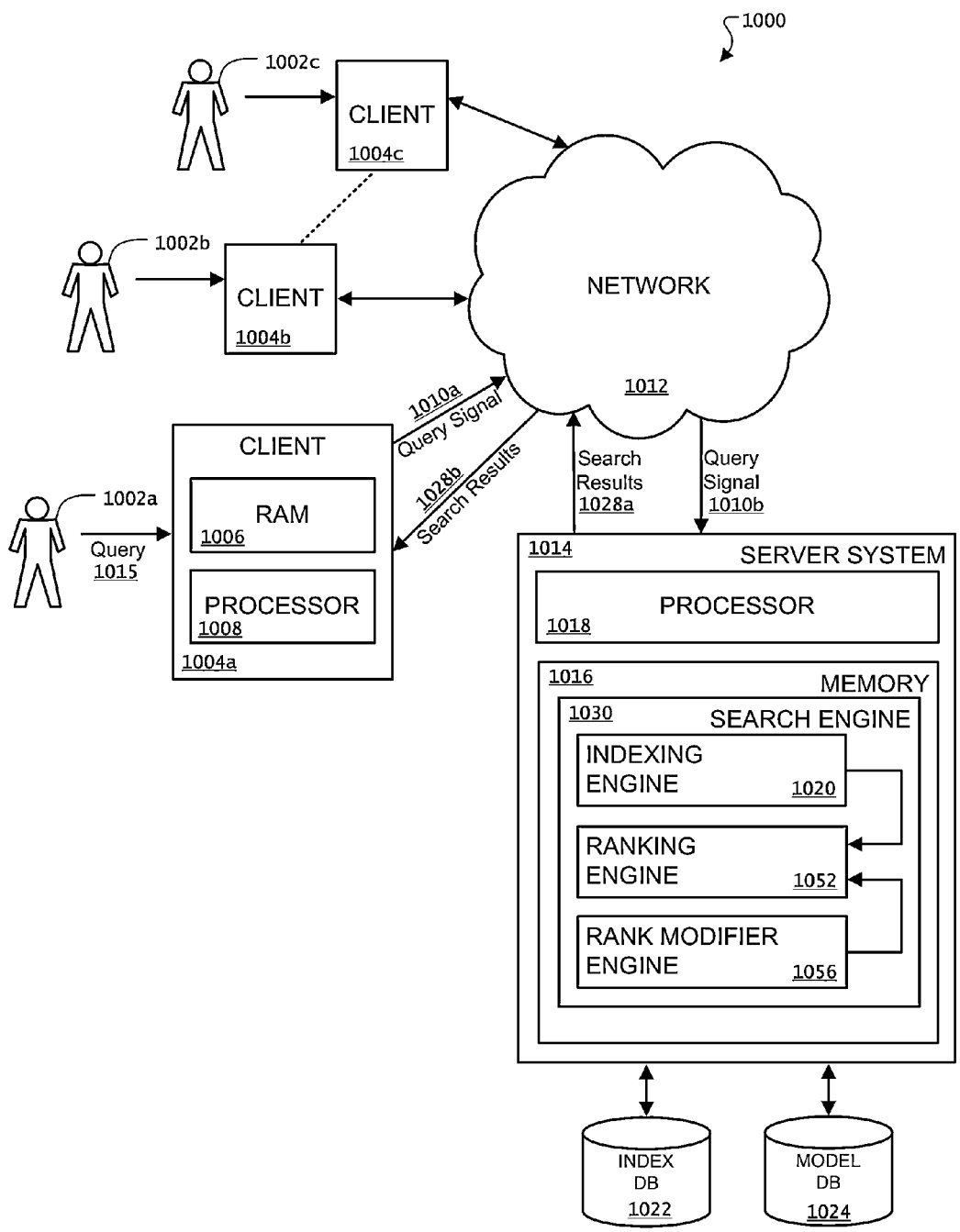
FIG. 1 shows an example information retrieval system.

FIG. 1 shows an example information retrieval system 1000. The information retrieval system can be implemented in an internet, intranet, or other client/server environment for retrieving relevant results in response to search queries submitted by users. The system 1000 is an example of an information retrieval system in which the systems, components, and techniques described below can be implemented. Although several components are illustrated, there may be fewer or more components in the system 1000. Moreover, the components can be distributed on one or more computing devices connected by one or more networks or other suitable communication mediums.

In the example system 1000, a user 1002 (1002a, 1002b, 1002c) interacts with the system 1000 through a client device 1004 (1004a, 1004b, 1004c) or other device. The client device 1004 can be a computer terminal within a local area network (LAN) or wide area network (WAN). The client device 1004 includes a random access memory (RAM) 1006 (or other memory and/or a storage device) and a processor 1008. The processor 1008 is structured to process instructions within the device 1004. The processor 1008 is a single-threaded or multi-threaded processor having one or more processor cores, for example. In some implementations, the processor 1008 is structured to process instructions stored in the RAM 1006 (or other memory and/or a storage device included with the client device 1004) to display graphical information for a user interface.

A user 1002a connects to the search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 is one or more server devices in one or more locations. A server device 1014 includes a memory device 1016, which includes the search engine 1030 loaded therein. A processor 1018 is structured to process instructions within the device 1014. These instructions implement one or more components of the search engine 1030. The processor 1018 is a single-threaded or multi-threaded processor having one or more processing cores, for example. The processor 1018 processes instructions stored in the memory 1016 related to the search engine 1030 and sends information to the client device 1004, through the network 1012, to create a graphical presentation in a user interface of the client device 1004 (e.g., a search results web page displayed in a web browser).

The server-side query signal 1010b is received by the search engine 1030. The search engine 1030 uses the information within the user query 1015 (e.g. query terms) to find relevant documents. The search engine 1030 includes an indexing engine 1020 that actively searches a corpus (e.g., web pages on the Internet) to index the documents found in that corpus. The index information for the documents in the corpus is stored in an index database 1022. This index database 1022 is accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in a file.

The search engine 1030 includes a ranking engine 1052 to rank the documents related to the user query 1015. The ranking of the documents is performed using techniques for determining an information retrieval (IR) score for indexed documents in view of a given query. The relevance of a particular document with respect to a particular search term or to other provided information is determined by various appropriate techniques. For example, the general level of back-links to a document that contains matches for a search term may be used to infer a document's relevance. In particular, if a document is linked to by many other relevant documents, it is inferred that the linked document is particularly relevant. This inference is made because the authors of the pointing documents presumably point, for the most part, to other documents that are relevant to their audience. If the pointing documents are in turn the targets of links from other relevant documents, they are considered more relevant, and the first document is considered particularly relevant because it is the target of relevant (or even highly relevant) documents. Such a technique may be the determinant of a document's relevance or one of multiple determinants.

To further improve the accuracy of document ranking, the ranking engine 1052 receives additional signals from a rank modifier engine 1056 to assist in determining an appropriate ranking for the documents. The rank modifier engine 1056 provides one or more measures of relevance for the documents, which can be used by the ranking engine 1052 to improve the search results' ranking provided to the user 1002. The rank modifier engine 1056 can perform one or more of the operations described further below to generate the one or more measures of relevance. For example, the ranking of a particular document with respect to a particular search term can be influenced by user feedback collected from previous sessions where the same result document are presented for the same query entered by other users. User feedback is described in further detail below. If many users have shown interest in a particular result document for a particular query, it can be inferred that this particular documents is particularly relevant for subsequent users that enter the same query as well. The ranking of this particular document is promoted in the list of result documents presented to the subsequent users. The user feedback data collected over time is stored in a model database 1024. Many parameters of a user's response to a result document can be collected, and the data can be mined to derive signals of interest to improve the search engine and better serve the users.

The search engine 1030 forwards the final, ranked result list within a server-side search result signal 1028a through the network 1012. Exiting the network 1012, a client-side search result signal 1028b is received by the client device 1004a where the results are stored within the RAM 1006 and/or used by the processor 1008 to display the results on an output device for the user 1002a.

Figure 2A:
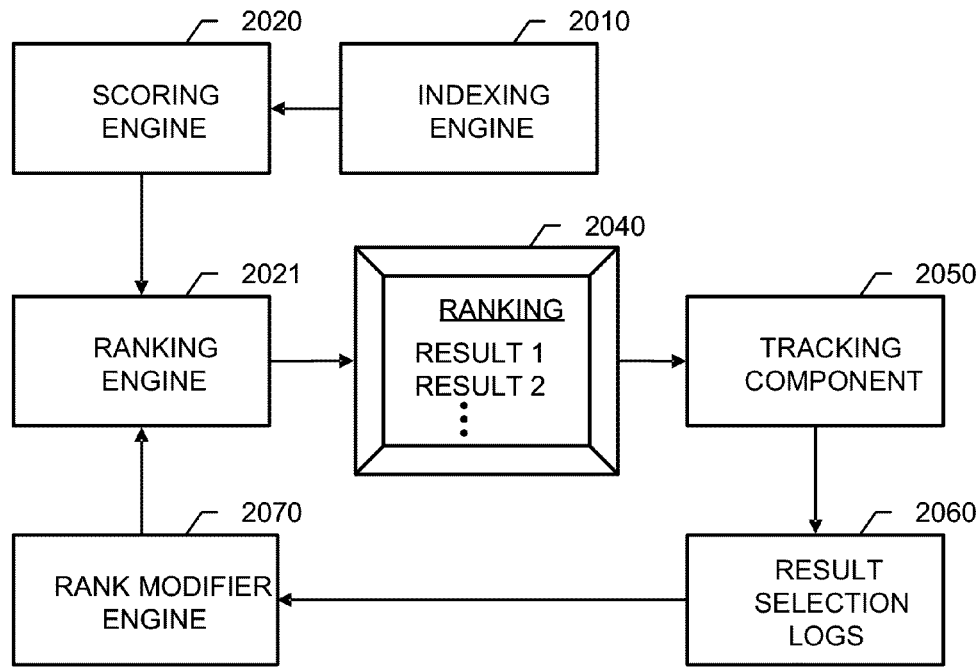
FIGS. 2A and 2B show components of two example information retrieval systems.

FIG. 2A shows example components of an information retrieval system. These components include an indexing engine 2010, a scoring engine 2020, a ranking engine 2030, and a rank modifier engine 2070. The indexing engine 2010 functions as described above for the indexing engine 1020. The scoring engine 2020 generates scores for document results based on many different features, including content-based features that link a query to document results, and query-independent features that generally indicate the quality of document results. The content-based features include, for example, aspects of document format, such as query matches to title or anchor text in an HTML (Hyper Text Markup Language) page. The query-independent features include, for example, aspects of document cross-referencing of the document or the domain. Each of these and other features can be represented as a respective property parameter that is input to the scoring engine 2020. Moreover, the particular functions used by the scoring engine 2020 can be tuned, to adjust the various feature contributions to the final IR score, using automatic or semi-automatic processes.

The ranking engine 2030 produces a ranking of document results 2040 for display to a user based on IR scores received from the scoring engine 2020 and one or more signals from the rank modifier engine 2070. A tracking component 2050 is used to record information regarding user behavior such as individual user selections of the results presented in the ranking 2040. In some implementations, the tracking component 2050 is embedded JavaScript or other code included in a web page ranking 2040 that identifies user selections (e.g., mouse clicks, finger hand touch gestures, or speech commands) of individual document results and also identifies when the user returns to the results page, thus indicating the amount of time the user spent viewing the selected document result. In other implementations, the tracking component 2050 is a proxy system through which user selections of the document results are routed. The tracking component can also include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) selected by the user.

The recorded information is stored in result selection logs 2060. In various implementations, the recorded information includes log entries that indicate user interaction with each result document presented for each query submitted. For each user selection of a result document presented for a query, the log entries indicate the query (Q), the document (D), the user's dwell time (T) on the document, the language (L) employed by the user, and the country (C) where the user is likely located (e.g., based on the server used to access the IR system). The log entries also records negative information, such as the fact that a document result was presented to a user (counted as an impression), but was not selected.

Other information such as position(s) of click(s) (i.e., user selection(s)) in the user interface, information about the browser session (e.g., existence and type of previous clicks, and post-click session activity), IR scores of clicked results, IR scores of all results shown before the click, the titles and snippets shown to the user before the click, the user's cookie, cookie age, IP (Internet Protocol) address, user agent of the browser, and so on, can also be recorded.

In various implementations, the time (T) between the initial click-through to the document result and the user's returning to the main page and clicking on another document result is also recorded. An assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 2B:
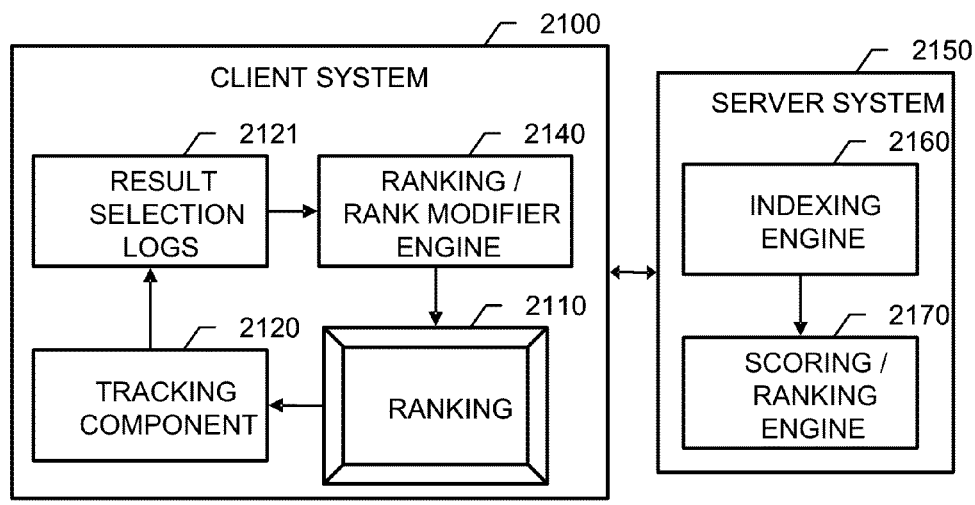

FIG. 2B shows another example information retrieval system. In this system, a server system 2150 includes an indexing engine 2160 and a scoring/ranking engine 2170. A client system 2100 includes a user interface for presenting a ranking 2110, a tracking component 2120, result selection logs 2121 and a ranking/rank modifier engine 2140. For example, the client system 2100 can include a company's enterprise network and personal computers, in which a browser plug-in incorporates the ranking/rank modifier engine 2140. When an employee in the company initiates a search on the server system 2150, the scoring/ranking engine 2170 can return the search results along with either an initial ranking or the actual IR scores for the results. The browser plug-in then re-ranks the results locally based on tracked page selections for the company-specific user base.

Figure 3:
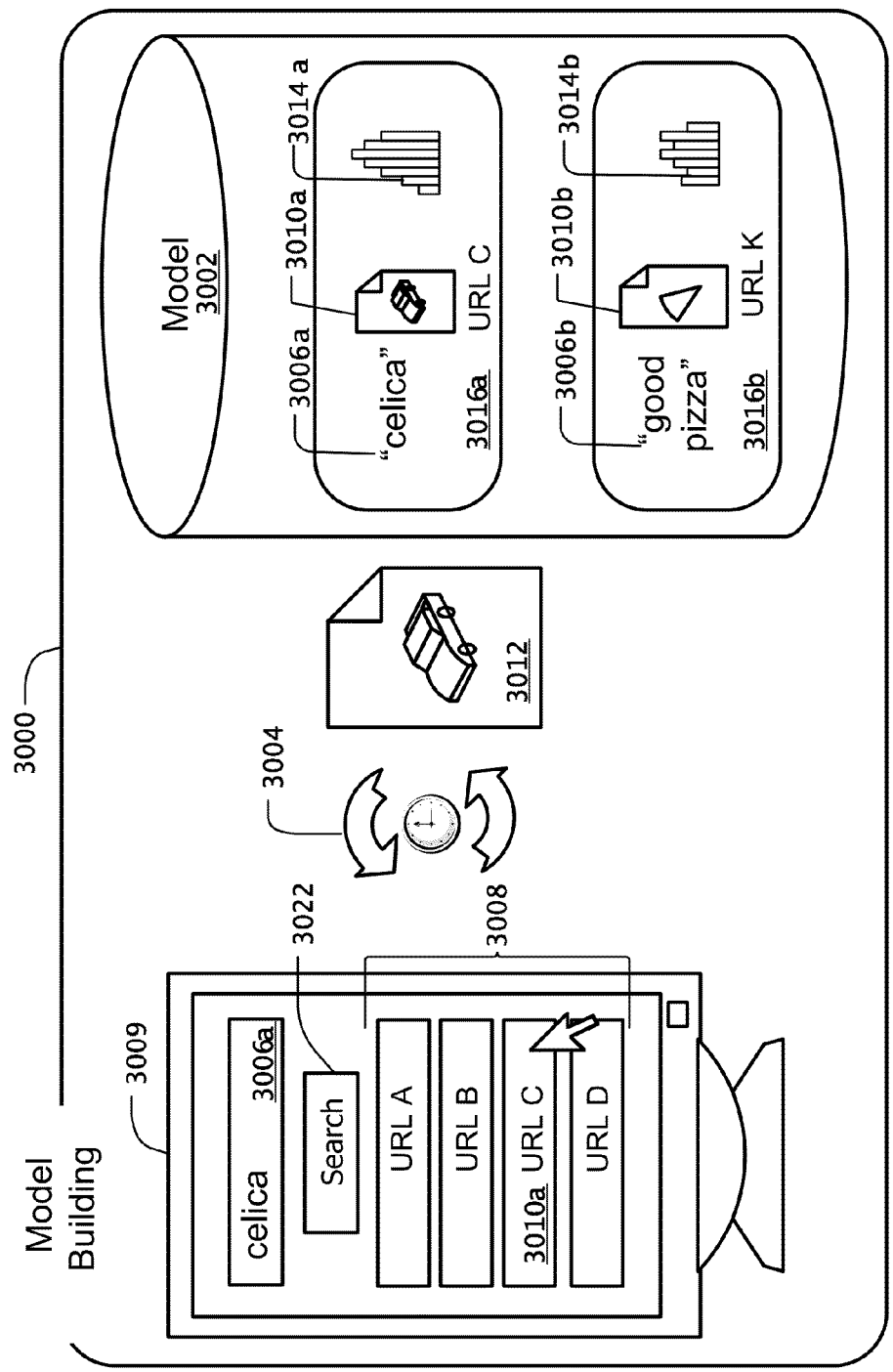
FIG. 3 illustrates an example user feedback data model.

FIG. 3 is a diagram illustrating the building of an example model database 3002 for use with an information retrieval system. The model database 3002 is one or more databases that aggregate information indicative of user behavior on at least a per-query and per-document basis. In various implementations, information in the model database 3002 is used as input to a process that ranks documents or enhances the ranking. For example, the model information can be used as input to interactive or non-interactive internet search engines, image search engines, video search engines, book search engines, consumer product search engines, other suitable processes capable of ranking documents, and combinations of these.

In various implementations, a document is referenced by a universal resource locator (URL) in the model database 3002; however, other types of document references are possible. For instance, a document can be a webpage on the World Wide Web referenced by a URL.

As shown in FIG. 3, a user submits a query 3006a "celica," for example, to an information retrieval system, such as a search engine, through a graphical user interface 3009, as presented on a personal computer, a mobile telephone, or other device. A query includes one or more terms. For example, a query of a travel database can include the terms "bus," "route," "along," "Charles," "River." In addition to dictionary words, terms can include special characters, numbers, mathematical expressions, Boolean expressions, slang terms, names, titles, images, sounds, videos, other suitable query terms, and combinations of these. Moreover, query terms can be in more than one language.

In response to the user selecting the search button 3012, for example, a search engine returns a ranking or result list 3008 which is an ordered list of references to documents that are responsive to the query 3006a. The result list 3008 includes a set of document references URL A, URL B, URL C (3010a), and URL D. The result list 3008 can contain the text of the URL itself, a short description of the information found within each document, a snapshot of the portion of the document which contains the query, other suitable information, or a combination of these. If a user selects (e.g., clicks) URL C 3010a from the result list 3008, for example, the selected URL can cause the user interface 3009 (e.g., a web browser)

to present the associated document 5012. Once the user has finished viewing the document, the user can navigate back to the result list 3008.

In various implementations, the model database 3002 is built as users interact with search engines. Each presentation of a document reference in the result list in response to a query is recorded as an "impression" of the referenced document in connection with the query. Each selection of the presented document reference is a recorded as a "click" for the document in connection with the query. A timer 3004 can be used to track how long a user views or "dwells" on the document. For example, a longer time spent dwelling on a document, such as 60 seconds or more, (i.e., a "long click") can indicate that a user found the document to be relevant for the query. A brief period viewing a document, such as five seconds or less, (i.e., a "short click") can be interpreted as a lack of document relevance. In some implementations, the click data 3014 is a count of clicks of all types (e.g., long, medium, short) for a particular query 3006 and document 3010 combination. In some implementations, the click data 3014 includes a count of each click type (e.g., long, medium, short) for a particular query 3006 and document 3010 combination. Aggregated click data from queries for a given document can be used to rank or enhance a ranking of that document. By way of illustration, a quantity of user feedback data can be a weighted average of the count of long clicks for a given document and query pair.

A search engine or other process creates a record 3016 in the model database 3002 for documents that are selected by users in response to a query. Each record 3016 within the model 3002 (herein referred to as a tuple <document, query, data>) is at least a combination of a query 3006 submitted by users, a document reference 3010 selected by users in response to that query, and a collection of data 3014 that is associated with the query, the document, and/or the document-query pair. In various implementations, model data is locale-specific (e.g., country, state, etc.) or language-specific.

In various implementations, the collection of data 3014 associated with a document-query pair includes user feedback data for a respective document as a search result for a respective query associated with the document-query pair. The user feedback data includes, for example, an aggregation of click data (e.g., click-through counts, impression counts, click-to-impression ratios, weighted click counts, and so on) collected from users that have been shown the document and/or selected the document in response to the query.

In various implementations, the collection of data 3014 associated with a document-query pair further includes various other parameters, scores, and/or measures of various qualities of the document, the query, and the document-query pair. These other parameters, scores, and/or measures of qualities (or collectively "signals") are either stored as part of the record 3016, or referenced in the record 3016 and retrievable from other information storage means. These signals include data (e.g., query terms, anchor text, domain names, and numbers of advertisements presented on webpages) that are collected from various sources (e.g., client device, web servers, and so on). Sometimes, these signals also include derived signals (e.g., popularity scores of documents, popularity scores of queries, competitiveness scores of queries, commerciality scores of queries, query length, relevance scores of documents, quality scores of documents, and so on) that have been generated by the information retrieval system based on various other collected or derived signals.

The various signals associated with a document-query pair are indicative of various properties of the document, the query, or the document-query pair. For example, a signal defined by the IR score of the top result document of a query is indicative of the quality of the query. A signal defined by the submission frequency or total submission volume of a query is indicative of the popularity of the query. A signal defined by the total number of advertisements targeting the search terms of a query is indicative of the commerciality of the query. A signal defined by the total number of advertisements presented on a document is indicative of the commerciality of the document. A signal defined by the total number of queries to which a document is responsive indicates the breath of the topic coverage of the document. A signal defined by the total number of result documents responsive to a query is indicative of the competitiveness of each document responsive to the query. A signal defined by the IR score of the document as a search result to a query is indicative of the relevance of the document in the context of the query. Other signals of various properties of the documents, the queries, and the document-query pairs can be defined and implemented. Other extensions of model data are possible.

Figure 4A:
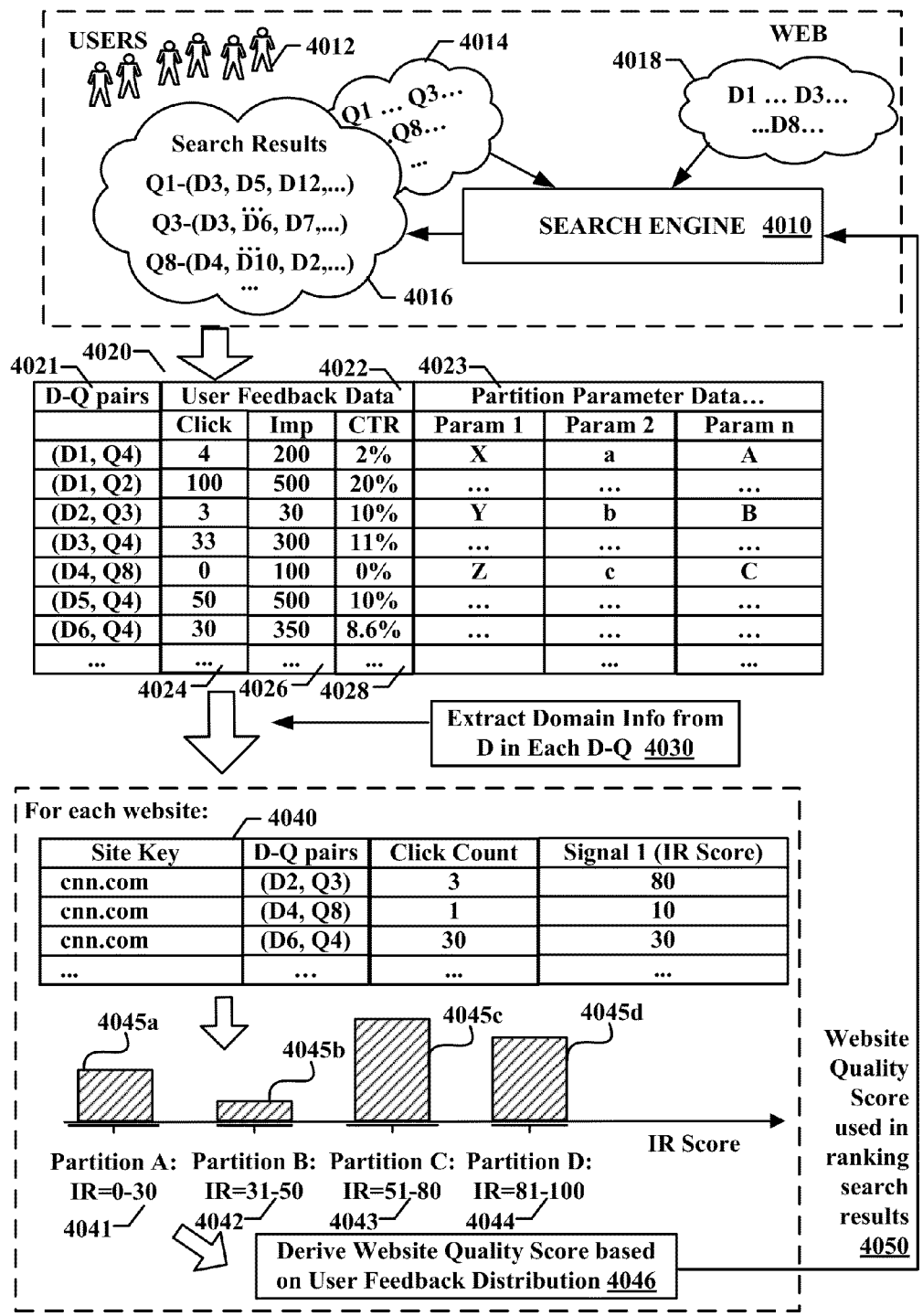
FIGS. 4A and 4B are block diagrams illustrating an example process for evaluating an example property parameter (e.g., website quality) based on aggregated user feedback data distributed among different partitions of user feedback data made according to a partition parameter (e.g., IR score of top result document).
Figure 4B:
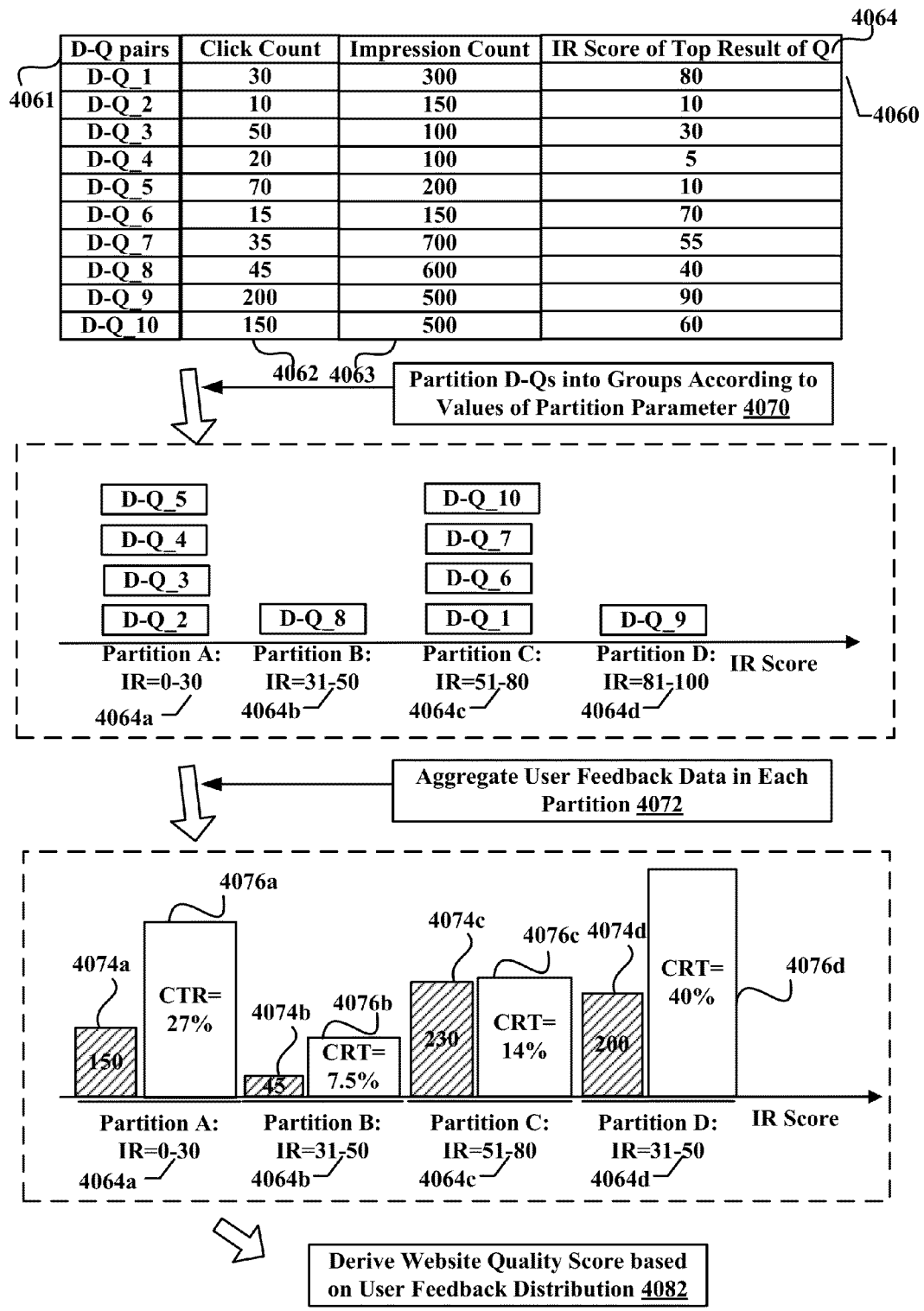

In various implementations, one or more signals in the collection of data associated with the document-query pairs are used to segregate or partition the user feedback data (e.g., click data that are aggregated across users and over time) associated with the document-query pairs at a website level. Each signal can define a different partition parameter. FIGS. 4A and 4B are block diagrams illustrating an example process for evaluating an example property parameter of a website based on aggregated user feedback data distributed among different partitions of user feedback data made according to a partition parameter.

The partition parameter is a signal defined or selected based on a particular property that influences the quality of the website, in either a query-dependent context or a query-independent context. Examples of such website properties include, for example, website quality, website popularity, website commerciality, website authority, and so on. A respective property parameter can be defined for each of these website properties, and evaluated to represent the quality, popularity, commerciality, and authoritativeness of the website as a whole. These evaluated property parameters for the website as a whole are also indicative of the quality, popularity, commerciality, and authoritativeness of individual documents from the website, and can be used as inputs to a ranking engine or a rank modifier engine that ranks search results that include documents from the website.

As discussed with respect to FIG. 3, and also shown in FIG. 4A, a process for gathering user feedback data (e.g., click and impression data) and building a model database starts with users 4012 submitting search queries 4014 to a search engine 4010 and receiving lists of result documents 4016 responsive to each of the search queries 4014. Each of the lists of result documents contains document references (e.g., URLs of webpages) to documents 4018 on the World Wide Web, for example. User interaction with the presented result lists and/or result documents are tracked by various mechanisms and sent back to the search engine 4010 or other process. The search engine 4010 or other process creates records in a data model 4020 for documents that are presented to and/or selected by users in response to a query.

The records in the data model 4020 are stored, for example, as document-query pairs (D-Qs) 4021 in the data model 4020 with corresponding user feedback data 4022 and partition parameter data 4023. Partition parameter data 4023 for each D-Q include values of one or more partition parameters associated with the D-Q. In some implementations, some or all of the partition parameter data 4023 associated with each D-Q are stored separately from the data model 4020 and are identified and retrieved as needed.

In the example shown in FIGS. 4A and 4B, each document-query pair (D-Q) 4021 is associated with a respective query (Q), a respective document reference (D), respective user feedback data 4022, and respective partition parameter data 4023. In many instances, a document is responsive to multiple queries, and is associated with multiple D-Qs. Similarly, a query has multiple responsive documents, and is associated with multiple D-Qs as well. In various implementations, D-Qs are locale-specific (e.g., country, state, etc.) or language-specific (e.g, English).

In some implementations, the respective user feedback data 4022 associated with a D-Q includes an aggregation of click data 4024 (e.g., raw click count or weighted click count) across users that have selected the respective document reference (D) in response to the respective query (Q). Other user feedback data includes, for example, an impression count 4026 of the respective document (D) in response to the respective query (Q) and a click-through rate 4028 (CTR) for the respective document (D) as a search result for the respective query (Q). An impression count is the total number of times that the respective document reference (D) has been presented in a result list in response to the respective query (Q). A click-through rate (CTR) represents the fraction of impressions that have resulted in a user selecting the document reference from the result list. Other types of user feedback data are possible.

The partition parameter data 4023 associated with a D-Q include values of various partition parameters. The partition parameters can be defined by parameters, scores, or measures of various qualities (or collectively, "signals") of the document (D), the query (Q), and the document-query pair (D-Q). The partition parameter data is used to segregate or partition the user feedback data in the data model 4020. Examples of the signals that can server as a partition parameter for the segregation of user feedback data include a measure of query quality as indicated by the IR score of the top result document of a query, a measure of query popularity as indicated by the total query volume or the query submission frequency of a query, a measure of topic coverage of the document as indicated by the total number of queries for which the document is responsive to, and so on. Other definitions and/or selection of partition parameters are possible, depending on the particular website property or attribute that is of interest to the search engine 4010 in ranking documents in searches.

In the context of an internet search engine, each document (D) associated with a D-Q has a hosting website. In many instances, a hosting website is associated multiple documents and multiple D-Qs in the D-Q model 4020. To utilize the user feedback data and the partition parameter data associated with the D-Qs in the D-Q model 4020 in evaluating a property parameter of the website (e.g., quality of the website), the host or domain information associated with each D-Q is first extracted (4030) from the associated document reference (D) of each D-Q pairs.

For example, the document reference of each D-Q is a URL by which the D-Q's associated respective document (D) is identified and retrieved from a web server. The URL includes a portion that identifies the domain name of the website that hosts the associated respective document (D). The host or domain information in the URL is extracted and stored as a respective site key for each D-Q. The site keys are used to identify a collection of D-Qs that are associated with documents from a common website. The documents from the website form a document group (e.g., the collection of data records 4040) that is identified by the respective site key (e.g., "cnn.com"). In addition to using the host or domain names as site keys for documents on the web, other forms of site keys or group identifiers can be implemented for groups of documents in other document depositories.

In order to determine whether a particular website is of high quality in terms of producing relevant, accurate, and/or popular search results, one or more suitable partition parameters (e.g., Param 1, Param 2, etc.) are selected and used to segregate the set of D-Qs associated with the particular website. One suitable partition parameter is the IR score of the top result for a query across all websites. The rationale for selecting such a partition parameter is that, if the IR score of the top result for a query across all websites is high, it is more likely than not that the query is a well-formulated query, and that the user feedback data for documents responsive to the query are more likely to reflect the quality of the documents and the quality of the websites containing the documents. On the other hand, if the IR score of the top result for a query across all websites is low, it is more likely than not that the query is ill-formed or related to an obscure topic, and the user feedback data for documents responsive to the query are less likely to accurately reflect the quality of the documents and the quality of the websites containing the documents. Therefore, by using this signal to segregate the user feedback data associated with a particular website, a high concentration of positive user feedback (e.g., as reflected by a high click-through rate or a large number of click-throughs) in the high IR score range indicates high website quality, while a high concentration of positive user feedback in the low IR score range does not indicate high website quality. Other partition parameters can be defined and/or selected for the evaluation of various website properties or attributes.

In the example using the IR score of the top result for a query as the partition parameter, the whole IR score range is divided into several partitions, where each partition is defined by a corresponding value range for the IR score. Suitable value ranges that define the partitions do not need to be uniform and can be determined based on empirical data analysis of websites with known properties or attributes, for instance. The number of partitions may also vary depending on the partition parameter and/or the desired granularity of data analysis. In this example, the IR score range is from 0 to 100, and is divided into four consecutive partitions (4041-4044): "Partition A: IR=0-30," "Partition B: IR=31-50," "Partition C: IR=51-80," and "Partition D: IR=81-100."

Each document-query pair (D-Q) associated with the particular website (e.g., cnn.com) is assigned to a corresponding partition according to the match between the value of the partition parameter associated with the D-Q and the value range defining the partition. Depending on the IR scores associated with each D-Q in the collection of D-Qs associated with the website, each partition may include different numbers of D-Qs and each D-Q is associated with respective user feedback data.

Once all the D-Qs associated with the particular website have been assigned to their respective partitions according to the values of their partition parameter, the user feedback data associated with the D-Qs are aggregated within each partition. For example, an aggregated click count (e.g., 4045*a-d*) is computed for each partition by summing the click count associated with each D-Q in the partition. For another example, an aggregated click-through rate (CTR) is computed for each partition by dividing the aggregated click count by the aggregated impression count of all the D-Qs in the partition. The method of aggregation may vary depending on the nature and definition of the user feedback data.

Once the desired aggregated user feedback data is computed for each partition, a distribution of the aggregated user feedback data among the different partitions is obtained. For example, as shown in FIG. 4A, the aggregated click counts (4045*a-d*) for the website "cnn.com" are mostly concentrated in the high IR ranges 51-80 and 81-100. This concentration of aggregated click counts in the high IR ranges tends to indicate that the website is of high quality. In some implementations, an aggregated click-through rate is computed for each partition as well. A combination of both high click-through rate and high click-count in the high IR ranges provide even stronger indication that the website is of high quality.

To evaluate the property parameter, in this case, website quality, a website quality score is derived either based on the entire distribution of aggregated user feedback data among the partitions, or the aggregated user feedback data for a selected subset of partitions (e.g., the partitions defined by IR score >50) (4044).

In some implementations, the website quality score is derived based on a combination of multiple distributions of aggregated user feedback data, where each distribution of aggregated user feedback data is obtained according to a different partition parameter. For example, in addition to the IR score of the top result document of the query, another partition parameter relevant to website quality is query length (e.g., the number of terms in a search query). Queries that are neither too short nor too long tend to produce results that are good matches to the query (i.e., neither too general nor too specific). Therefore, if the clicks for documents on a website concentrate in the partitions that are associated with the high IR ranges, and in the partitions that are associated with queries having only two or three words, then it is highly likely that the website is of high quality.

The formula for deriving a website quality score, the relevant partition parameters that should be used for partitioning the user feedback data, and the correlation between website quality and the distribution of aggregated user feedback data among the partitions can be determined using empirical data analysis of websites with known qualities and user feedback data. Models of the correlations between user feedback distribution and various website properties, including website quality, can be developed and trained using website property measures obtained through other means.

The website quality scores derived for websites are used in search result ranking involving documents from the websites (4050). In some implementations, the website quality score is used as one of the parameters in selecting and ranking the list of result documents responsive to a search query. Alternatively, the website quality score is used to boost or demote rankings of particular documents from the website in the list of result documents responsive to the search query.

FIG. 4B illustrates a more detailed process for evaluating an example property parameter (e.g., website quality) based on aggregated user feedback data distributed among different partitions defined by a example partition parameter (e.g., IR score of top result document).

In this example, a set of D-Qs 4061 (e.g., D-Q_1 ... D-Q_10 shown in data collection 4060) are associated with a common website. Each D-Q in the set is associated with respective user feedback data, including a click count 4062 for the respective document (D) associated with the D-Q as a search result for the respective query (Q) associated with D-Q. The user feedback data associated with each D-Q further includes an impression count 4063 for the respective document (D) presented as a search result for the respective query (Q) of the D-Q. Each D-Q is also associated with respective partition parameter data 4064, including a respective value of a partition parameter defined by the IR score of the top result for the respective query associated with the D-Q.

The complete IR range (e.g., 1-100) is divided into four partitions: Partition (e.g., 4064*a-d*) A: IR=0-30," "Partition B: IR=31-50," "Partition C: IR=51-80," and "Partition D: IR=81-100." The set of D-Qs are assigned into the four different partitions based on the respective value of the partition parameter associated with each of the D-Qs (4070). For example, D-Q_2, D-Q_3, D-Q_4, and D-Q_4 all have IR scores within the range 0-30, therefore, they are all assigned to Partition A 4064*a* defined by IR=0-30. D-Q_8 is the only D-Q whose associated IR value is within the value range defined by partition B 4064*b*, and only D-Q_8 is assigned to Partition B. Similarly, D-Q_1, D-Q_6, D-Q_7, and D_Q_10 are assigned to Partition C 4064*c*; and D-Q_9 is assigned to Partition D 4064*d*.

Once all D-Qs associated with the website have been assigned to their respective partitions according to the values of the partition parameter associated with the D-Qs, aggregated user feedback data is computed for each partition (4072). In this example, the user feedback data associated with each D-Q include a click count for the D-Q, and the aggregated user feedback data for each partition include the sum of click counts for all D-Qs assigned to that partition. In addition, the user feedback data associated with each D-Q include an impression count and a click-to-impression ratio, and the aggregated user feedback data for each partition include an aggregated click-to-impression ratio, for example, computed as the sum of click counts divided the sum of impression counts of all D-Qs assigned to that partition.

The resulting aggregated user feedback data distributions include, for example, a distribution of aggregated click count (4074*a-d*) for each partition and an aggregated click-through rate (4076*a-d*) for each partition. In this particular example, the aggregated click count 4094*a* for Partition A is the sum of the click counts associated with D-Q_2, D-Q_3, D-Q_4 and D-Q_5. The aggregated click-through rate (4076*a*) for Partition A is calculated by dividing the aggregated click count (e.g., 150) for Partition A by the aggregated impression count (e.g., 550) for Partition A. The aggregated click-through rate for other partitions is calculated similarly using the user feedback data associated with the D-Qs within each partition.

In this particular example, most of the clicks fall within the two partitions that are defined by IR scores greater than a high IR score threshold (e.g., IR=50). The aggregated click-through rates for the high IR partitions are also relatively high (e.g., at 40% and 14%, respectively). Therefore, the website is likely to be of good quality. A website quality score can be derived (4082) based on the distributions of aggregated user feedback data among the different partitions or certain partitions that are of particular interest (e.g., IR score >50).

In some implementations, the distributions of aggregated user feedback data among different partitions made according to one or more partition parameters are used to filter out websites of poor quality. Threshold values of the aggregated user feedback data can be specified for certain partitions of interest. For example, if, for a website, the aggregated click count for the high IR score partition is below a click count threshold and the aggregated click through rate for the high IR score partition is also below a click-through rate threshold, then the website is considered of poor quality. A website quality score can be computed for the website. When ranking a document from the website as a search result responsive to a search query, the rank of the document is demoted based on the poor quality score of the website.

Figure 5A:
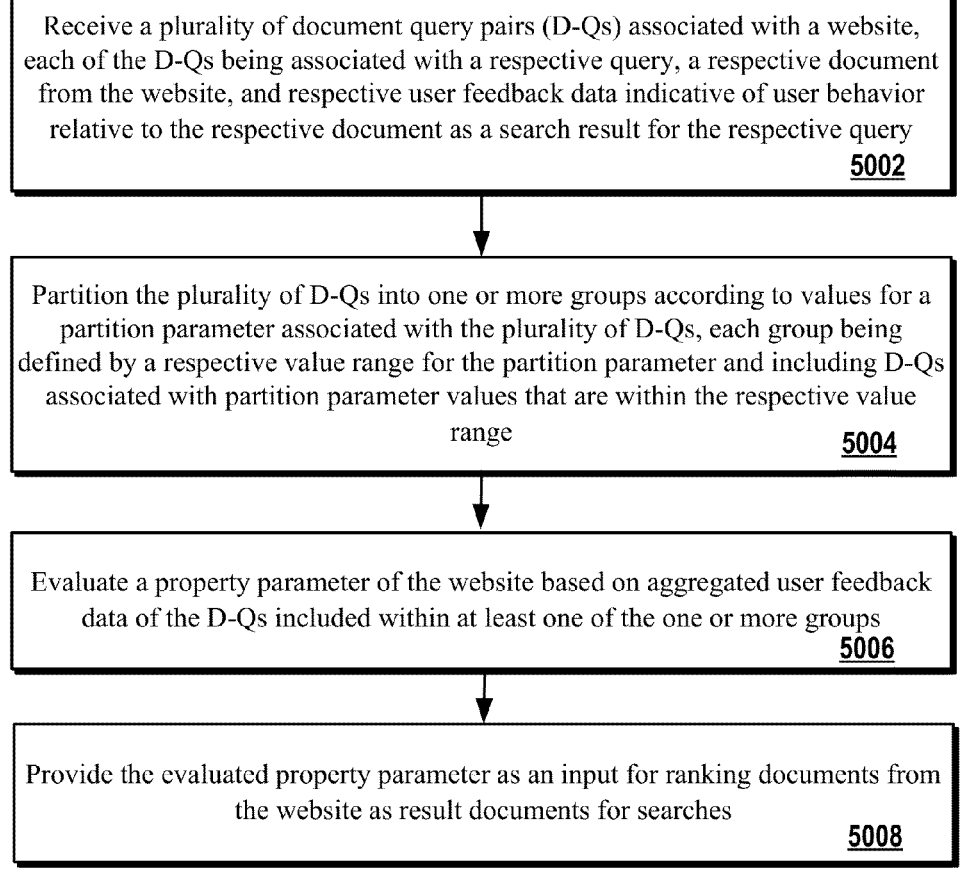
FIGS. 5A and 5B are flow diagrams for an example process for evaluating a property parameter of a website based on aggregated user feedback data distributed among different partitions of user feedback data made according to a partition parameter.
Figure 5B:
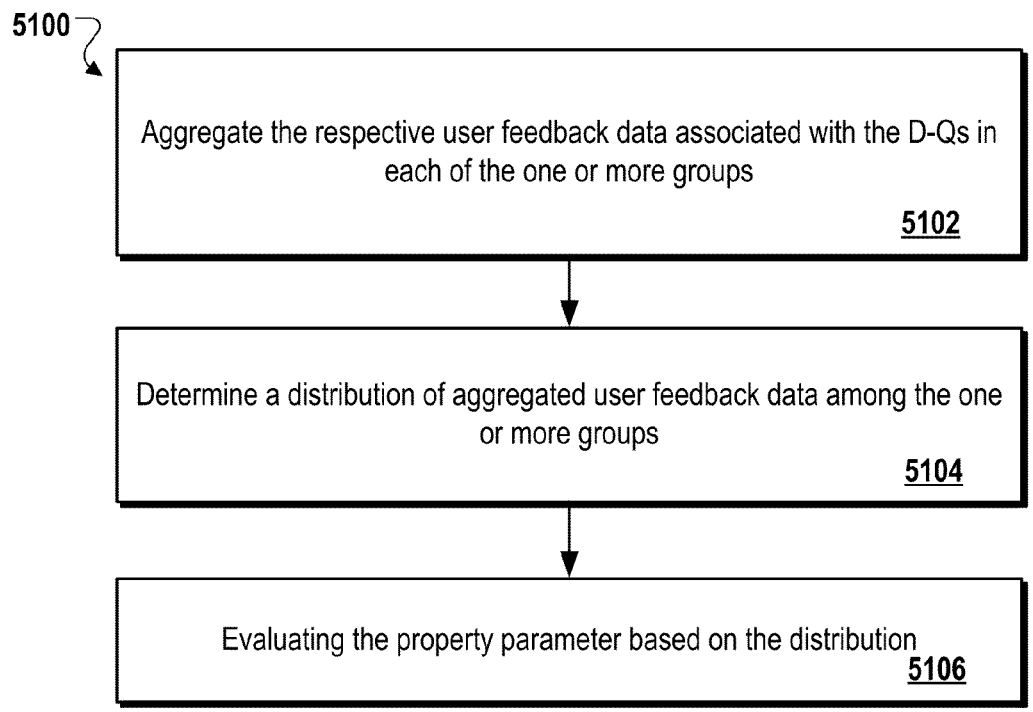

FIGS. 5A and 5B are flow diagrams for an example process 5000 for evaluating a property of a website based on aggregated user feedback data distributed among different partitions of user feedback data made according to a partition parameter. The process starts when a plurality of document-query pairs (D-Qs) associated with a common website is received (5002). Each of the plurality of D-Qs is associated with a respective query (Q), a respective document (D) from the common website, and respective data. In some implementations, the D-Qs associated with the common website are identified by extracting the host and domain information from the URLs of the documents (Ds) associated with the D-Qs. The respective data associated with each D-Q include user feedback data and partition parameter data. The user feedback data are data indicative of user behavior relative to the respective document (D) as a search result for the respective query (Q), and the partition parameter data include a value of a partition parameter associated with the respective query (Q) or document (D). In some implementations, values of multiple partition parameters associated with the respective query or document are included as part of the partition parameter data.

In some implementations, the user feedback data associated with each D-Q include a click count for the document (D) as a search result for the query (Q), an impression count for the document (D) presented as a search result for the query (Q). The user feedback data sometimes also include derived information such as the click-through rate or click-to-impression ratio for the document (D) as a search result of the query (Q), a weighted click count or click-through rate based on click duration, click recency, and other factors indicating user interest to the document (D) in the context of the query (Q). Click duration is a measure of the time (T) between a user selecting a link on a result listing to visit a result document and the user returning from the result webpage to the result listing. In some implementations, a click with a longer duration is given more weight in computing the click count. Click recency is a measure of the age of a click that was received for a document in response to a query. In some implementations, an older click is given less weight than a more recent click in computing the click count. Other methods of calculating the click count are possible, for example, spam clicks (e.g., fraudulent or machine-generated clicks) can be disregarded from the click count.

Many definitions of partition parameters are possible. In one example, the partition parameter associated with each D-Q is the IR score of the top-ranked document responsive to the respective query (Q) of the D-Q across all D-Qs in the database. The IR score of a document responsive to a query is a score derived for the document in a search result ranking process, and is indicative of the document's relevance to the query. The IR score of the top result for a query is also indicative of whether the query is a well-formulated query and whether the subject matter of the query and the result document are of sufficiently quality and general applicability in other searches. If the IR score of the top result document for a query is very low, it is probably because that either the query or the document, or the subject matter of the query are obscure or of poor quality. IR scores of the top result documents of queries are relevant in determining website quality because the IR scores indicate query quality, and positive feedback for webpages responsive to high quality queries is likely to reflect good webpage quality, and therefore, good website quality.

In another example, the partition parameter is defined by query length. A query includes a single search term or multiple search terms. Typically, if a search query includes a single term, many results will be returned, and many of the search results are likely to be irrelevant for what the user actually intends to search for because there is too much room for ambiguity in a single search term. Alternatively, if a search query includes a large number of search terms, very specific results will be returned regardless of the quality and general applicability of the website serving the result documents. Positive user feedback for result documents of queries that are of medium length (e.g., two or three words) are indications that the result documents are of good quality. Therefore, a high aggregated click count in partitions defined by a medium query length (e.g., two or three terms) likely indicates good website quality.

In yet another example, the partition parameter is defined as the total number of search results responsive for a query. The total number of search results responsive for a query is indicative of how much significance positive user feedback toward a particular result document should be given in determining the quality of a website serving the particular result document. If many results were returned for a search query, then the positive feedback for a result document from a website is a stronger indicator of relevance and quality for the document and the website than if only a small number of results were returned for the search query.

In addition to website quality, other properties of a website can be evaluated using suitable partition parameters. For example, a relevant input in search result ranking is a measure of popularity for a website. A partition parameter is defined by the total query volume (total number of submissions of the query) or query submission frequency for a query. This partition parameter measures query popularity. For example, if the total number of submissions for the search query "bankruptcy" is 3000 per day, and the total number of submissions for the search query "arachnids" is 50 per day, then the query "arachnids" is a less popular query than the query "bankruptcy." The measure of query popularity is relevant in determining website popularity because websites serving well-received documents responsive to popular queries are likely to be popular websites.

For another example, a relevant input in search result ranking is a property parameter that measures the commerciality of a website. Knowing the level of commerciality of a website helps ranking search result in a product search, for example. Alternatively, highly commercial website is also likely to be a spammed website with lots of advertising but little relevant information. A suitable partition parameter for deriving the commerciality score of a website is defined by the number of advertisements presented on the webpage. Alternatively, a suitable partition parameter may be defined by the number of advertisements targeting the search terms in a search query. Positive feedback for highly commercial documents or documents responsive to highly commercial queries likely indicates that the website serving the documents are highly commercial as well. A highly commercial website may be promoted in a product search, but may be demoted in a search for non-commercial information.

Other partition parameters are possible. The correlations between properties of website, partition parameters, and the distribution of aggregated user feedback among different partitions can be explored through empirical data obtained through other means.

After the set of D-Qs associated with the common website is identified, the set of D-Qs are partitioned into one or more groups based on the values of the partition parameter associated with the plurality of D-Qs (5004). Each group being defined by a respective value range for the partition parameter and include D-Qs associated with values of the partition parameter that are within the respective value range. The value ranges may be defined differently for different partition parameters. The value ranges do not have to be uniform. In some implementations, only one value range of interest is specified, and D-Qs with values of the partition parameter within that value range are identified. All other D-Qs are discarded from consideration. In some implementations, the entire value range of the partition parameter is divided into consecutive sections.

After the set of D-Qs associated with the common website are assigned to their respective partitions according to the values of the partition parameter, the user feedback data associated with the D-Qs in at least one of the one or more partitions are aggregated. In some implementations, the partition(s) of interest are selected based on empirical data analysis. For example, if the partition parameter is the IR score of the top result document of a query, the partition that is of particular importance to website quality determination is the high IR score range and the low IR score range, for example, as defined by a high IR score threshold and a low IR score threshold. High concentration of positive user feedback in the high IR score range indicates that the website is of good quality, while high concentration of positive user feedback in the low IR score range would indicate poor website quality. For another example, if the partition parameter were query length, then the partitions that are of particular importance would be query length of two or three terms. Since queries of two or three terms tend to cause retrieval of results that are neither too broad nor too specific, user feedback data concentrated in the corresponding partitions would be a good indicator of website quality.

After the aggregated user feedback data is obtained for the partitions of interest, a property parameter for the website is evaluated based on the aggregated user feedback data for the partitions of interest (5006). The property parameter is indicative of a property or attribute of the website, such as quality, popularity, relevance, commerciality, authority, and so on. The selection of the partition parameter is based on the particular property of the website that is to be evaluated. For example, if the property of interest is the commerciality of a website, the partition parameter that is used to partition the user feedback data can be the commerciality of the query or the commerciality of the document. If the property of interest is the authoritativeness of the website, the partition parameter that is used to partition the user feedback data is the competitiveness of the query or the IR score of the document.

The various property parameters for a website that are obtained using the process 5000 are useful as inputs for ranking documents from the website in searches. For example, the popularity of the website, the authoritativeness of the website, the quality of the website, the commerciality of the website, and so on can all be used to promote or demote a document from the website as a search result for a query. Therefore, the evaluated property parameter is provided as an input for ranking documents from the website as result documents for searches (5008).

In some implementations, instead of the aggregated user feedback data for particular partitions, the distribution of aggregated user feedback data across all partitions are used to evaluate the property parameter for the website. FIG. 5B shows an example process 5100 for evaluating the property parameter based on the distribution of aggregated user feedback data. For example, the respective user feedback data associated the D-Qs in each of the one or more groups are aggregated (5102), and therefore a distribution of aggregated user feedback data across all partitions is determined (5104). The property parameter for the website is evaluated based on the distribution (5106). The distribution is characterized, for example, by a particular shape, a skew factor, and so on. For example, if the distribution of the aggregated user feedback data is skewed toward the high IR score ranges, the distribution indicates that the website is of good quality. In contrast, if the distribution is screwed to the low IR ranges, then it indicates that the website is of poor quality.

In some implementations, combinations of multiple distributions based on different partition parameters are used to improve the accuracy of the website property evaluation. For example, if the aggregated user feedback data is skewed toward the high IR scores, and the aggregated user feedback data is skewed toward highly competitive queries, then it is highly likely that the website is of good quality. The prediction of good quality is stronger than if the aggregated user feedback is skewed toward high IR scores while the aggregated user feedback is also skewed toward uncompetitive queries.

In some implementations, combinations of multiple distributions of aggregated user feedback data for the same partition parameter can be used. For example, the combination of the distribution of aggregated click count and the distribution of aggregated click-through rate are used. High click count for the high IR ranges as well as high click-through rate for the high IR ranges are used together to indicate good website quality. If either of the click count or the click-through rate in the high IR ranges does not satisfy a corresponding threshold value, then the website is not considered as having high quality.

Various quality data of websites obtained through other means can be used to build models that explore and verify the correlations between the distributions of aggregated user feedback data and the partition parameters. User feedback distributions for websites of different properties and attributes are compared to derive distribution characteristics that are indicative of the different properties. The derived distribution characteristics are then used to predict the properties of other websites.

Figure 6:
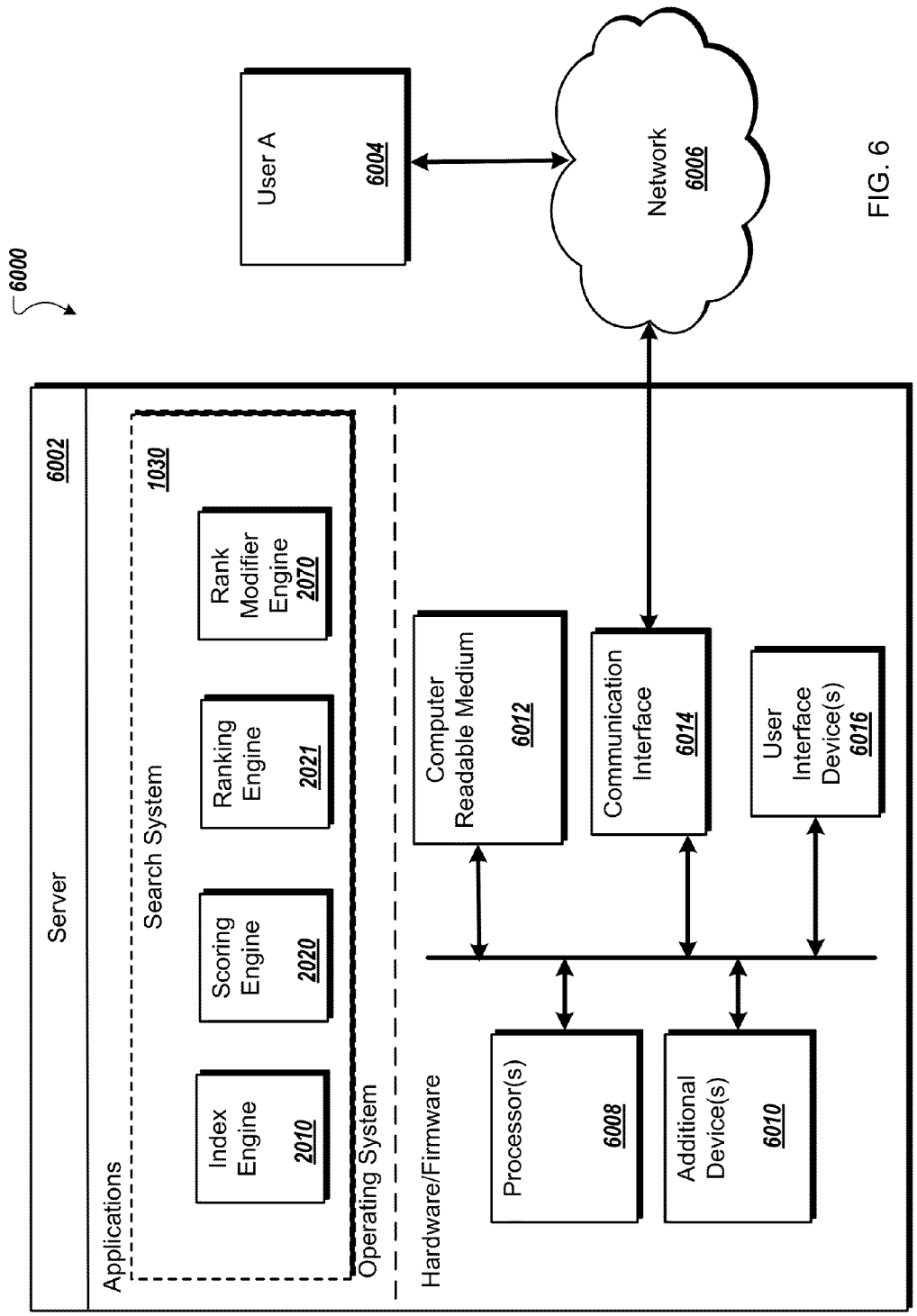
FIG. 6 is illustrates an example architecture of a system.

FIG. 6 illustrates an example architecture of a system 6000. The system consists of a server 6002 and one or more user computers such as user computer A 6004. The server 6002 and user computers are connected through a network 6006.

The server 6002 consists of one or more data processing apparatus. While only one data processing apparatus is shown in FIG. 6, multiple data processing apparatus can be used. The server includes various modules, e.g. executable software programs, including a search system 1030. The search system includes various modules, such as an index engine 2010, a scoring engine 2020, a ranking engine 2021, and a rank modifier engine 2070. Each module runs as part of the operating system on the server, runs as an application on the server, or runs as part of the operating system and part of an application on the server. These modules can implement the processes described with respect to FIGS. 5-6.

The server 6002 can also have hardware or firmware devices including one or more processors 6008, one or more additional devices 6010, a computer readable medium 6012, a communication interface 6014, and one or more user interface devices 6016. Each processor 6008 is capable of processing instructions for execution within the server 6002. In some implementations, the processor 6008 is a single-threaded processor. In other implementations, the processor 6008 is a multi-threaded processor. Each processor 6008 is capable of processing instructions stored on the computer readable medium 6012 or on a storage device (e.g., an additional device 6010). The server 6002 uses its communication interface 6014 to communicate with one or more computers, for example, over a network. Examples of user interface devices 6016 include a display, a camera, a speaker, a microphone, a tactile feedback device, a keyboard, and a mouse.

The server 6002 can store instructions that implement operations associated with the modules described above, for example, on the computer readable medium 6012 or one or more additional devices 6010, for example, one or more of a floppy disk device, a hard disk device, an optical disk device, or a tape device. In some implementations, the data processing apparatus 6002 also stores additional data, for example, user preference data, parent-query associations, candidate siblings, final siblings, or other data, on the computer readable medium 6012 or one or more additional devices 6010.

User computers such as user computer A 6004 are connected to the server 6002 through the network 6006. Users submit search queries to the server 6002 and select search results received from the server 6002 using user computers such as user computer A 6004, for example, using a web-browser running on the computer. The server 6002 generates user feedback data from the actions of the users, for example, by tracking what search queries are submitted by users and what search results responsive to a query are selected by users. Users can also use user computers such as user computer A 6004 to submit search queries to the server 6002 and to view search results responsive to their queries, as well as query refinements for the queries.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. Accordingly, other embodiments are within the scope of the following claims.

What is claimed is:

1. A computer-implemented method, comprising:
obtaining a plurality of document-query pairs associated with a website, each of the document-query pairs being associated with a respective query, a respective document from the website, and respective user feedback data for the respective document as a search result for the respective query;
assigning each of the plurality of document-query pairs to one of a plurality of partitions according to an information retrieval score of a document for the respective query of the pair, each partition being defined by a distinct respective information retrieval score range;
aggregating the respective user feedback data associated with the document-query pairs in two or more of the partitions, wherein at least one of the partitions represents aggregated user feedback data from a plurality of different document-query pairs;
determining a first distribution of the aggregated user feedback data among the two or more partitions;
calculating a skew of the first distribution;
determining an indication of quality of the website based on at least the calculated skew of the first distribution; and
providing the indication of quality of the website as an input for ranking documents from the website as search results.

2. The method of claim 1, wherein each user feedback data includes one or more of a click-count, an impression count, and a click-to-impression ratio.

3. The method of claim 2, wherein the click-count is weighted by click-duration.

4. The method of claim 2, wherein the click-count is weighted by click-recency.

5. The method of claim 1, further comprising:
assigning each of the plurality of document-query pairs to one of a plurality of second partitions according to a length of the respective query of the document-query pair, each second partition being defined by a distinct respective length range.

6. The method of claim 5, wherein determining the indication of quality of the website further comprises:
aggregating the respective user feedback data associated with the document-query pairs in two or more of the second partitions;
determining a distribution of aggregated user feedback data among the two or more second partitions; and
determining the indication of quality of the website based on a combination of the first distribution and the second distribution.

7. The method of claim 1, further comprising:
assigning each of the plurality of document-query pairs to one of a plurality of second partitions according to a measure of popularity of the respective query of the document-query pair, each second partition being defined by a distinct respective measure of popularity range.

8. The method of claim 7, wherein determining the indication of quality of the website further comprises:
aggregating the respective user feedback data associated with the document-query pairs in two or more of the second partitions;
determining a distribution of aggregated user feedback data among the two or more second partitions; and
determining the indication of quality of the website based on a combination of the first distribution and the second distribution.

9. The method of claim 1, further comprising
assigning each of the plurality of document-query pairs to one of a plurality of second partitions according to a measure of commerciality of the respective query of the document-query pair, each second partition being defined by a distinct respective measure of commerciality range.

10. The method of claim 9, wherein determining the indication of quality of the website further comprises:
aggregating the respective user feedback data associated with the document-query pairs in two or more of the second partitions;
determining a distribution of aggregated user feedback data among the two or more second partitions; and
determining the indication of quality of the website based on a combination of the first distribution and the second distribution.

11. The method of claim 1 wherein the score of the document for the respective query of the pair is a score of a top ranked document for the respective query of the pair.

12. A computer-readable storage medium having instructions stored thereon, which, when executed by at least one processor, cause the processor to perform operations comprising:

obtaining a plurality of document-query pairs associated with a website, each of the document-query pairs being associated with a respective query, a respective document from the website, and respective user feedback data for the respective document as a search result for the respective query;

assigning each of the plurality of document-query pairs to one of a plurality of partitions according to an information retrieval score of a document for the respective query of the pair, each partition being defined by a distinct respective information retrieval score range;

aggregating the respective user feedback data associated with the document-query pairs in two or more of the partitions;

determining a first distribution of the aggregated user feedback data among the two or more partitions;

calculating a skew of the first distribution;

determining an indication of quality of the website based on, at least, the calculated skew of the first distribution; and providing the indication of quality of the website as an input for ranking documents from the website as search results.

13. The computer-readable storage medium of claim 12, wherein each user feedback data includes one or more of a click-count, an impression count, and a click-to-impression ratio.

14. The computer-readable storage medium of claim 13, wherein the click-count is weighted by click-duration.

15. The computer-readable storage medium of claim 13, wherein the click-count is weighted by click-recency.

16. The computer-readable storage medium of claim 13 wherein the score of the document for the respective query of the pair is a score of a top ranked document for the respective query of the pair.

17. The computer-readable storage medium of claim 12, further comprising:

assigning each of the plurality of document-query pairs to one of a plurality of second partitions according to length of the respective query of the document-query pair, each second partition being defined by a distinct respective length range.

18. The computer-readable storage medium of claim 17, wherein determining the indication of quality of the website further comprises:

aggregating the respective user feedback data associated with the document-query pairs in two or more of the second partitions;

determining a distribution of aggregated user feedback data among the two or more second partitions; and determining the indication of quality of the website based on a combination of the first distribution and the second distribution.

19. The computer-readable storage medium of claim 12, further comprising:

assigning each of the plurality of document-query pairs to one of a plurality of second partitions according to a measure of popularity of the respective query of the document-query pair, each second partition being defined by a distinct respective measure of popularity range.

20. The computer-readable storage medium of claim 19, wherein determining the indication of quality of the website further comprises:

aggregating the respective user feedback data associated with the document-query pairs in two or more of the second partitions;

determining a distribution of aggregated user feedback data among the two or more second partitions; and determining the indication of quality of the website based on a combination of the first distribution and the second distribution.

21. The computer-readable storage medium of claim 12, further comprising:

assigning each of the plurality of document-query pairs to one of a plurality of second partitions according to a measure of commerciality of the respective query of the document-query pair, each second partition being defined by a distinct respective measure of commerciality range.

22. The computer-readable storage medium of claim 21, wherein determining the indication of quality of the website further comprises:

aggregating the respective user feedback data associated with the document-query pairs in two or more of the second partitions;

determining a distribution of aggregated user feedback data among the two or more second partitions; and determining the indication of quality of the website based on a combination of the first distribution and the second distribution.

23. A system comprising:

a computer-readable storage medium having instructions stored thereon; and one or more computers programmed to execute the instructions comprising:

obtaining a plurality of document-query pairs associated with a website, each of the document-query pairs being associated with a respective query, a respective document from the website, and respective user feedback data for the respective document as a search result for the respective query;

assigning each of the plurality of document-query pairs to one of a plurality of partitions according to an information retrieval score of a document for the respective query of the pair, each partition being defined by a distinct respective information retrieval score range;

aggregating the respective user feedback data associated with the document-query pairs in two or more of the partitions;

determining a first distribution of the aggregated user feedback data among the two or more partitions;

calculating a skew of the first distribution;

determining an indication of quality of the website based on, at least, the calculated skew of the first distribution; and providing the indication of quality of the website as an input for ranking documents from the website as search results.

24. The system of claim 23, wherein each user feedback data includes one or more of a click-count, an impression count, and a click-to-impression ratio.

25. The system of claim 24, wherein the click-count is weighted by click-duration.

26. The system of claim 24, wherein the click-count is weighted by click-recency.

27. The system of claim 24 wherein the score of the document for the respective query of the pair is a score of a top ranked document for the respective query of the pair.

28. The system of claim 23, further comprising:
assigning each of the plurality of document-query pairs to one of a plurality of second partitions according to length of the respective query of the document-query pair, each second partition being defined by a distinct respective length range.

29. The system of claim 28, wherein determining the indication of quality of the website further comprises:
aggregating the respective user feedback data associated with the document-query pairs in two or more of the second partitions;
determining a distribution of aggregated user feedback data among the two or more second partitions; and
determining the indication of quality of the website based on a combination of the first distribution and the second distribution.

30. The system of claim 23, further comprising:
assigning each of the plurality of document-query pairs to one of a plurality of second partitions according to a measure of popularity of the respective query of the document-query pair, each second partition being defined by a distinct respective measure of popularity range.

31. The system of claim 30, wherein determining the indication of quality of the website further comprises:
aggregating the respective user feedback data associated with the document-query pairs in two or more of the second partitions;
determining a distribution of aggregated user feedback data among the two or more second partitions; and
determining the indication of quality of the website based on a combination of the first distribution and the second distribution.

32. The system of claim 23, further comprising:
assigning each of the plurality of document-query pairs to a one of a plurality of second partitions according to a measure of commerciality of the respective query of the document-query pair, each second partition being defined by a distinct respective measure of commerciality range.

33. The system of claim 32, wherein determining the indication of quality of the website further comprises:
aggregating the respective user feedback data associated with the document-query pairs in two or more of the second partitions;
determining a distribution of aggregated user feedback data among the two or more second partitions; and
determining the indication of quality of the website based on a combination of the first distribution and the second distribution.

* * * * *

UNITED STATES PATENT AND TRADEMARK OFFICE
CERTIFICATE OF CORRECTION

| | | |
|---|---|---|
| PATENT NO. | : 8,615,514 B1 | Page 1 of 1 |
| APPLICATION NO. | : 12/699549 | |
| DATED | : December 24, 2013 | |
| INVENTOR(S) | : Neil C. Fernandes, Michael E. Flaster and April R. Lehman | |

It is certified that error appears in the above-identified patent and that said Letters Patent is hereby corrected as shown below:

Title Page

Page 3, item (56) column 2, line 26 in the listing of Other Publications, delete "webmasterwolrd" and insert -- webmasterworld --.

Page 3, item (56) column 2, line 70 in the listing of Other Publications, delete "Unobstrusive" and insert -- Unobtrusive --.

In the Claims

In Claim 1, column 20, line 2, delete "on at least" and insert -- on, at least, --.

In Claim 23, column 22, line 36, after "instructions" insert -- to perform operations --.

In Claim 32, column 24, line 12, delete "a one of a" and insert -- one of a --.

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,615,514 B1
APPLICATION NO. : 12/699549
DATED : December 24, 2013
INVENTOR(S) : Neil C. Fernandes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this
Twenty-first Day of April, 2015

Michelle K. Lee
*Director of the United States Patent and Trademark Office*